US009487307B2

(12) United States Patent
Peterson (10) Patent No.: US 9,487,307 B2
(45) Date of Patent: Nov. 8, 2016

(54) MICROBRIDGES FOR REGIONAL AIRCRAFT AND METHODS OF USING SAME

(71) Applicant: Robert L. Peterson, Salt Lake City, UT (US)

(72) Inventor: Robert L. Peterson, Salt Lake City, UT (US)

(73) Assignee: Gatelink Aircraft Boarding Systems, Inc., Salt Lake City, UT (US)

( * ) Notice: Subject to any disclaimer, the term of this patent is extended or adjusted under 35 U.S.C. 154(b) by 0 days.

(21) Appl. No.: 14/675,571

(22) Filed: Mar. 31, 2015

(65) Prior Publication Data
US 2016/0009414 A1  Jan. 14, 2016

Related U.S. Application Data (60) Continuation of application No. 14/224,823, filed on Mar. 25, 2014, now Pat. No. 8,990,989, which is a continuation of application No. 13/621,715, filed on Sep. 17, 2012, now Pat. No. 8,677,540, which is a division of application No. 12/730,853, filed on Mar. 24, 2010, now Pat. No. 8,266,750.

(51) Int. Cl.
*E01D 15/00* (2006.01)
*B64F 1/305* (2006.01)

(52) U.S. Cl.
CPC .................................. *B64F 1/305* (2013.01)

(58) Field of Classification Search
CPC .................................................. B64F 1/305
USPC ................................................. 14/71.5, 69.5
See application file for complete search history.

(56) References Cited

U.S. PATENT DOCUMENTS

| | | | |
|---|---|---|---|
| 1,894,528 A | | 1/1933 | Zimmerman |
| 2,470,337 A | * | 5/1949 | Campbell ............... E04F 10/02 135/131 |
| 2,470,696 A | | 5/1949 | Gonzalez et al. |
| 2,828,757 A | * | 4/1958 | Thaxton, Jr. .......... E04H 1/1205 135/116 |
| 3,046,850 A | * | 7/1962 | Tellefson ............... B61D 23/02 114/201 R |
| 3,121,243 A | * | 2/1964 | Phillips ................... B64F 1/305 14/69.5 |
| 3,131,705 A | * | 5/1964 | Marino .................... B60P 7/04 135/131 |
| 3,162,404 A | | 12/1964 | Squire |
| 3,263,254 A | * | 8/1966 | Wollard ................. B64F 1/305 14/71.5 |
| 3,317,942 A | * | 5/1967 | Wollard ................. B64F 1/305 14/71.5 |
| 3,571,990 A | | 3/1971 | Rossman |
| 3,730,359 A | | 5/1973 | Anderson |
| 3,747,147 A | | 7/1973 | Weese |
| 3,793,662 A | | 2/1974 | Gacs et al. |
| 3,842,553 A | | 10/1974 | Billgren et al. |
| 3,883,918 A | | 5/1975 | Magill |
| 4,044,516 A | | 8/1977 | Billgren |
| 4,110,859 A | | 9/1978 | Lichti |
| 4,161,049 A | | 7/1979 | Saunders et al. |

(Continued)

OTHER PUBLICATIONS

Apron Drive Dew-Bridge, Dec. 2001, http://web.archive.org/web20011221111812/dewbridge.com/products/aprondrive.html, 3 pages.

(Continued)

*Primary Examiner* — Raymond W Addie
(74) *Attorney, Agent, or Firm* — Thorpe North & Western, LLP (57) ABSTRACT

An aircraft boarding apparatus has a passenger bridge that has a confinement structure coupled to the second passenger bridge. The confinement structure exerts a ground-anchoring effect on the second passenger bridge to offset the ultralight configuration of the passenger bridge.

17 Claims, 7 Drawing Sheets

(56) References Cited

U.S. PATENT DOCUMENTS

| | | | |
|---|---|---|---|
| 4,218,034 A | 8/1980 | Magill | |
| 4,319,376 A | 3/1982 | Saunders | |
| 4,457,554 A | 7/1984 | Fuisz et al. | |
| 4,572,328 A | 2/1986 | Benko | |
| 4,620,339 A | 11/1986 | Shepheard | |
| 5,040,257 A | 8/1991 | Bentz | |
| 5,331,777 A * | 7/1994 | Chi-Yuan | E04H 15/505 135/124 |
| 5,522,192 A | 6/1996 | Frantl et al. | |
| 5,524,318 A | 6/1996 | Thomas | |
| 5,603,343 A | 2/1997 | Larson | |
| 5,761,757 A | 6/1998 | Mitchell et al. | |
| 5,853,150 A | 12/1998 | Kuchenbrod | |
| 6,055,692 A | 5/2000 | Pell et al. | |
| 6,122,789 A | 9/2000 | Stephenson et al. | |
| 6,279,855 B1 | 8/2001 | Domer | |
| 6,315,243 B1 | 11/2001 | Peterson | |
| 6,481,039 B1 | 11/2002 | Rolfe et al. | |
| 6,526,615 B1 | 3/2003 | Hutton et al. | |
| 6,691,361 B2 * | 2/2004 | Rolfe | B64F 1/305 14/71.1 |
| 6,732,975 B2 | 5/2004 | Peterson | |
| 6,793,178 B2 | 9/2004 | Peterson | |
| 6,923,214 B2 | 8/2005 | Widegren | |
| 6,929,217 B2 * | 8/2005 | Greaves | B64F 1/00 14/71.5 |
| 6,959,217 B2 | 10/2005 | DelMain et al. | |
| 7,069,611 B2 * | 7/2006 | Larson | B64F 1/30 14/71.1 |
| 7,243,878 B2 | 7/2007 | Peterson et al. | |
| 2002/0145079 A1 | 10/2002 | Burley | |
| 2007/0252037 A1 | 11/2007 | Greaves | |
| 2009/0184587 A1 | 7/2009 | Fernandez Diaz et al. | |

OTHER PUBLICATIONS

Dew Press Release, Jan. 2000, http://www.dewengineering.com/pr/dewbridge20000112.html, 2 pages.

Skywalker Boarding Bridge, Feb. 2005, http://web.archive.org/web/20050223054505/accessairsystems.com/skywalker.html, 2 pages.

\* cited by examiner

MICROBRIDGES FOR REGIONAL AIRCRAFT AND METHODS OF USING SAME

CROSS-REFERENCE TO RELATED APPLICATION

This application is a continuation of U.S. patent application Ser. No. 14/224,823, filed Mar. 25, 2014, now issued as U.S. Pat. No. 8,990,989, which is a continuation of U.S. patent application Ser. No. 13/621,715, filed on Sep. 17, 2012, now issued as U.S. Pat. No. 8,677,540, which is a divisional of U.S. application Ser. No. 12/730,853, filed on Mar. 24, 2010, now issued as U.S. Pat. No. 8,266,750, each of which are incorporated by reference.

FIELD

An embodiment relates to the field of airline travel. More particularly, an embodiment relates to the field of aircraft boarding piers, specifically to aircraft boarding piers servicing regional aircraft.

BACKGROUND

Air travel has becoming increasingly popular over the past decade and has evolved to handle an ever growing passenger volume. An important aspect of this evolution is the structure of flight routes through a "hub" airport. Today, hub routing has become an essential part of the efficient operation of an airline. Another marketing scheme includes the concept of maximizing nonstop flights for passenger convenience.

These trends have been influenced by the advent of regional aircraft. As the trends have continued, significant interest has been taken in smaller aircraft as commercial carriers, albeit perhaps as charter carriers.

The advent of regional aircraft has created a new market for air travel in which air passengers can span relatively large distances quickly on a regional aircraft.

BRIEF DESCRIPTION OF THE DRAWINGS

The accompanying drawings illustrate the present aircraft boarding piers and are a part of the specification. Together with the following description, the drawings demonstrate and explain the principles of the several embodiments of which.

DETAILED DESCRIPTION

In the following detailed description, reference is made to the accompanying drawings which form a part hereof, and in which is shown, by way of illustration, specific ways which embodiments may be practiced. In the drawings, like numerals describe substantially similar components throughout the several views. These embodiments are described in sufficient detail to enable those skilled in the art to practice various embodiments. Other embodiments may be utilized and structural, logical, and layout changes may be made without departing from the scope of the various embodiments.

Many useful regional aircraft boarding pier embodiments are described in detail below, which are integrated into a common concourse with boarding facilities for large aircraft. As used herein, a concourse comprises a single structure or wing of an airport with sequentially or otherwise indicated boarding gates for passenger aircraft. The term airport terminal can be synonymous with concourse or denotes a group of interconnected concourses.

Figure 1:
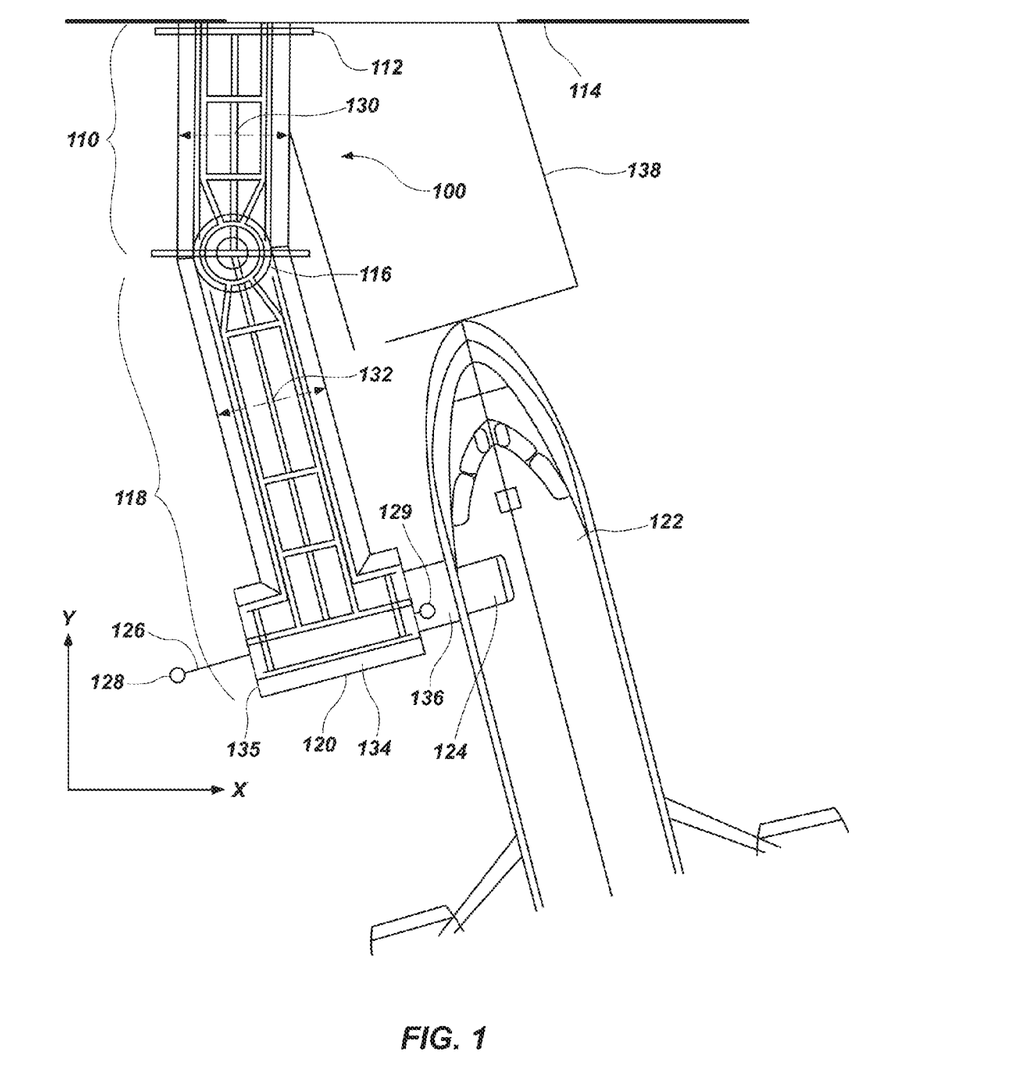
FIG. 1 is a plan layout of an aircraft boarding apparatus according to an embodiment.

FIG. 1 is a plan layout of an aircraft boarding apparatus 100 according to an embodiment. A first passenger bridge 110 is provided to anchor with an airport ramp. In an embodiment, the airport ramp includes a concourse interface 112 that is coupled to the external boundary 114 of an enclosed passenger concourse. A portion of the first passenger bridge 110 also includes an articulating first interface 116. The articulating first interface 116 can be seen in this plan layout as a circular floor element over which a passenger may walk. The aircraft boarding apparatus 100 also includes a second passenger bridge 118. In an embodiment, the second passenger bridge 118 is articulatingly coupled to the first passenger bridge 110. The second passenger bridge 118 includes an aircraft interface end 120 configured to couple with a regional aircraft 122 at the sill height of the passenger door 124. It can now be appreciated that in each embodiment, at least one of the first- and second passenger bridges 110 and 118 is inclined and elevated above the tarmac.

A confinement structure is coupled to the second passenger bridge 118. In an embodiment, the confinement structure includes a cable 126 that is secured to the ramp such as with two ground-anchored eye loops 128 and 129 at each end of the cable. The confinement structure, such as the cable 126 and two eye loops 128 and 129, exerts an active downward anchoring force on the second passenger bridge 118 in order to secure the second passenger bridge 118 for passenger-use stability and also for wind-load stability. The confinement structure allows the aircraft interface end 120 to align with the concourse interface 112 and the articulating first interface 116. As depicted in FIG. 1, the aircraft interface end 120 is not aligned with the concourse interface 112 and the articulating first interface 116 as the second passenger bridge 118 has been articulated to allow the regional aircraft 122 to dock. It can be appreciated that the second passenger bridge 118 can articulate to the left as depicted to approach the eye loop 128 and the second passenger bridge 118 would then be aligned with the concourse interface 112 and the articulating first interface 116. When the regional aircraft 122 is not in the docking position, the concourse interface 112 and the articulating first interface 116 can be aligned with the aircraft interface end 120 to make more useful ingress and egress of the regional aircraft 122.

The second passenger bridge 118 includes a unit-weight-per-unit-length ratio of less than 200 lbs per lineal foot. In an embodiment, the second passenger bridge 118 includes a unit-weight-per-unit-length ratio of less than 100 lbs per lineal foot. In an embodiment, the second passenger bridge 118 includes a unit-weight-per-unit-length ratio of less than 80 lbs per lineal foot. In an embodiment, the second passenger bridge 118 includes a unit-weight-per-unit-length ratio of less than or equal to 58 lbs per lineal foot. As a consequence of the unit-weight-per-unit-length ratio embodiments for the second passenger bridge 118, the second passenger bridge 118 may be referred to as an "ultralight" passenger bridge, both in reference to the second passenger bridge 118 alone, and in reference to the entire aircraft boarding apparatus 100. In an embodiment, the first passenger bridge 110 may have any of the unit-weight-per-unit-length ratio embodiments disclosed for the second passenger bridge 118. In an example embodiment, the first passenger bridge 110 has a unit-weight-per-unit-length ratio of less than 200 lbs per lineal foot and the second passenger bridge 118 has a unit-weight-per-unit-length ratio of less than or equal to 60 to 200 lbs per lineal foot. In an example embodiment, the first passenger bridge 110 has a unit-weight-per-unit-length ratio of less than 200 lbs per lineal foot and the second passenger bridge 118 has a unit-weight-per-unit-length ratio of less than 200 lbs per lineal foot. Other permutations of first passenger bridge 110 weight ratio to second passenger bridge 118 weight ratio that match individual disclosed unit-weight-per-unit-length ratios may be appreciated.

As a consequence of the ultralight configuration embodiments of the aircraft boarding apparatus 100, the second passenger bridge 118 may be manually articulated by a single ramp worker without the use of motorized or otherwise non-human effort. In an embodiment, the term "manually articulated" means mechanical devices are used such as a tow bar that is a manual hitch. In an embodiment, the term "manually articulated" means mechanical-advantage devices are used such as a tow bar that is a manual hitch attached to a ratcheting mechanism, or a crank handle that includes a reversible ratcheting mechanism. In any event, a mechanical assist means a device that allows the second passenger bridge 118 to be moved without any motorized assistance.

The aircraft boarding apparatus 100 is illustrated with length and width embodiments of the first passenger bridge 110 length of 15 foot, zero inches, and a first exterior width 130 of 8 foot, zero inches. The second passenger bridge 118 is illustrated as 25 foot, zero inches and a second exterior width 132 of 8 foot, zero inches. The interior width may therefore be in a range from 4 foot to about 8 foot (minus the collective wall widths). The second passenger bridge 118 is also coupled with a cab 134 such that the length of 25 foot, zero inches is measured to the center of the cab 134. The cab 134 also includes a boarding plate 136 that can be hinged to land upon the sill of the regional aircraft 122. The cab 134 also has a ground-crew interface 135 that may be open to allow ground personnel to handle gate-checked baggage according to an embodiment. It can now be appreciated that the first- and second passenger bridges 110 and 118 are inclined to meet sill height of a regional aircraft, the passenger bridges are elevated above the tarmac, and at least one passenger bridge has an ultralight weight embodiment.

The regional aircraft 122 may be pushed back away from the concourse interface 112 by a tug that may be parked within a tug footprint 138 according to an embodiment. The tug footprint 138 may run under the concourse interface 112 where the concourse may be elevated. Other structures are shown that may be understood as engineering drawing structures for construction of an aircraft boarding apparatus embodiment.

Figure 2:
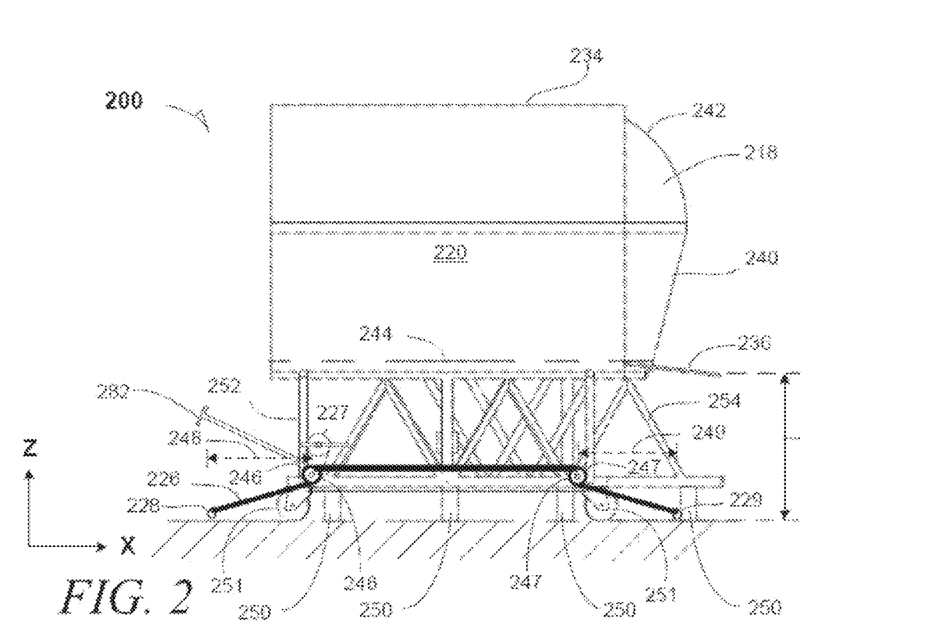
FIG. 2 is a side elevation of an aircraft boarding apparatus 200 according to an embodiment.

FIG. 2 is a side elevation of an aircraft boarding apparatus 200 according to an embodiment. The aircraft boarding apparatus 200 also includes a second passenger bridge 218 that includes walls 240 that couple to a ceiling 242. In an embodiment, the cab 234 is configured at a right angle to the length of the second passenger bridge 218 similarly to the configuration of the cab 134 and second passenger bridge 118 depicted in FIG. 1.

In an embodiment, the ceiling 242 is curvilinear as illustrated. In an embodiment, the walls 240 and ceiling 242 are an integral structure such as a single piece of organic material that can be affixed to a deck 244 (which is represented as a deck height in phantom lines). In an embodiment, the walls 240 and ceiling 242 are deployed under a tensile load such that the integral structure is affixed to the deck 244. In an embodiment, the tensile load includes wrapping the integral wall-ceiling structure 240 and 242 around hoops that can give a profile depicted in the illustrations.

The second passenger bridge 218 includes an aircraft interface end 220 (depicted as the surface of the cab 234 that is distal to the second passenger bridge 218) that is configured to couple with a regional aircraft at the sill height of the passenger door. The cab 234 also includes a boarding plate 236 that can be hinged to land upon the sill of a regional aircraft at sill height 235.

A confinement structure is coupled to the second passenger bridge 218. In an embodiment, the confinement structure includes a cable 226 that is secured to the ramp such as with two ground-anchored eye loops 228 and 229 at each end of the cable 226. The confinement structure embodiment also includes two pulleys 246 and 247 that allow the second passenger bridge 218 to be slidingly coupled to the cable 226. In the illustrated embodiment, the cable 226 and two eye loops 228 and 229 exert an active downward anchoring force on the second passenger bridge 218 in order to secure the second passenger bridge 218 for passenger-use stability and also for wind-load stability. The two pulleys 246 and 247 may also be configured with the cable 226 such as illustrated to assist in exerting a downward anchoring force on the second passenger bridge 218. Because of the constant downward force the confinement system applies on the aircraft boarding apparatus 200, the confinement system acts as an active anchor.

Figures 3, 4:
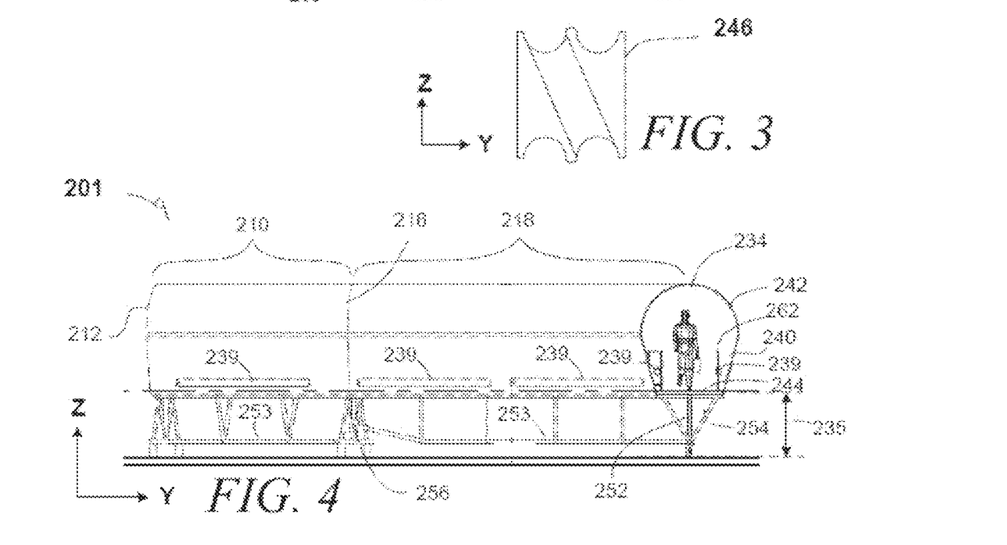
FIG. 3 is a front elevation of a pulley depicted in FIG. 2 according to an embodiment.
FIG. 4 is a side elevation of the aircraft boarding apparatus depicted in FIG. 2 according to an embodiment.

The confinement structure allows the aircraft interface end 220 to align with the concourse interface (see FIG. 4) and the articulating first interface (see FIG. 4). A first spacing 248 and a second spacing 249 are depicted between the first eye loop 228 and first pulley 246 and the second eye loop 229 and second pulley 247, respectively. In reference to spacing depicted, the cab 234 has been moved to the left but not to the extreme allowable position, which is where the first pulley 246 is directly above or almost directly above the first eye loop 228.

The aircraft boarding apparatus 200 may also be any of the ultralight combination embodiments that are disclosed for the aircraft boarding apparatus 100 depicted and described with reference to FIG. 1. As a consequence of the ultralight configuration of the aircraft boarding apparatus 200, the second passenger bridge 218 may be manually articulated by a single ramp worker without the use of motorized or otherwise non-human effort. In an embodiment, a tow bar 282 is used for convenience of the ramp worker for manually articulating the aircraft boarding apparatus 200.

In an embodiment, a motorized assist is applied for articulating the second passenger bridge 218. In an example embodiment, one or both of the two pulleys 246 and 247 is attached to an assembly such as a motor and drive-belt or drive-chain that causes the pulleys 246 and 247 to crawl along the cable 226.

In an embodiment, the tow bar 282 is used as a lever to articulate the second passenger bridge. In an example embodiment, the ramp worker rotates the handles of the tow bar 282 to the right (clockwise) to engage a ratcheting mechanism that may also be represented by the assembly 227 such that by moving the tow bar up and down, the ratcheting mechanism causes the pulleys 246 and 247 to crawl along the cable 226 such that the aircraft interface end 220 moves into position for docking with a regional aircraft.

In an example embodiment, the ramp worker rotates the handles of the tow bar 282 to the left (counter-clockwise) to engage a ratcheting mechanism that may be represented by the assembly 227 such that by moving the tow bar up and down, the ratcheting mechanism causes the pulleys 246 and 247 to crawl along the cable 226 such that the aircraft interface end 220 moves out of position to allow a regional aircraft to taxi into place or to push back. In any event, a motorized embodiment may allow a ramp worker to articulate the second passenger bridge 218 against a wind that is contrary to a desired articulation direction of the aircraft interface end 220. Similarly, a mechanical non-motorized embodiment such as a ratcheting mechanism may allow a ramp worker to articulate the second passenger bridge 218 against a wind that is contrary to a desired articulation direction of the aircraft interface end 220.

In an embodiment, a ratcheting mechanism is used as a lever to articulate the second passenger bridge. In an example embodiment, the ramp worker inserts a crank handle to the center of a ratcheting mechanism that may also be represented by the assembly 227. The assembly 227 may be set to ratchet either clockwise or counter-clockwise, such that by turning the crank, the ratcheting mechanism 227 causes the pulleys 246 and 247 to crawl along the cable 226 such that the aircraft interface end 220 moves into position, either for docking with a regional aircraft or out of position to allow a regional aircraft to taxi.

Other structures are shown that may be understood as engineering drawing structures for construction of an aircraft boarding apparatus embodiment. For example, feet 250 may be brought into contact with the ground to facilitate stability. For example, a lift mechanism such as is known for commercial step ladders may be used to lower the feet 250 to the tarmac after manually articulating the second passenger bridge 218. Wheels 251 are also depicted to allow the cab 234 to roll while the articulating first interface 216 is allowed to move. Other structures include vertical girders 252 and angle girders 254 to support the deck 244. In any event, the whole of the aircraft boarding apparatus 200 is built to achieve any of the ultralight embodiments disclosed herein.

FIG. 3 is a front elevation of a pulley 246 depicted in FIG. 2 according to an embodiment. The pulley 246 allows the cable 226 (FIG. 2) to wrap securely such that the second passenger bridge 218 can be articulated by a single ramp worker while the cable 226 and supporting equipment act as an active and dynamic anchor. The pulley 246 may be toothed to allow a locking ratchet to prevent rotation except when desired. Other ways to prevent pulley rotation except when desired may be employed such as a clutch mechanism to prevent pulley rotation except when desired. These devices and their equivalents are known and can be applied to these embodiments.

FIG. 4 is a side elevation of the aircraft boarding apparatus depicted in FIG. 2 according to an embodiment. The aircraft boarding apparatus 201 is seen in an orientation that is different from that depicted in FIG. 2. The first passenger bridge 210 may now be seen along the Y-dimension, as well as the second passenger bridge 218. The first passenger bridge 210 has a concourse interface 212 to couple to an external wall of a concourse. In an embodiment, the concourse interface is elevated as depicted, but it may be ground level according to an embodiment. When the concourse interface 212 including a portion of the deck 244 is at ground level, the first passenger bridge 210 is sloped from the ground level at the concourse interface 212 until it meets the articulating first interface 216. The first passenger bridge 210 and the second passenger bridge 218 are coupled at the articulating first interface 216. In an embodiment, the articulating first interface 216 includes a hinge 256 below the deck 244 that allows the second passenger bridge 218 to be articulated at the girder sub-structural level with respect to the first passenger bridge 210.

In an embodiment, at least one of the walls 240 or ceiling 242 is translucent such that natural light may illuminate a passenger's pathway along the bridges. In an embodiment, at least one of the walls 240 or ceiling 242 is at least partially translucent. For example, the walls 240 may bear a decorative stencil such as a perforated field that conveys an image, but has sufficient lacunae in the stencil to allow light to pass through. Such stencils are seen on commercial vehicles and even upon windows.

In an embodiment, lighting may be placed either inside the ceiling 242 or outside the aircraft boarding apparatus 200. As illustrated lighting 239 is affixed outside the walls 240 such that illumination through the walls 240 allows passengers to have a lighted pathway. In an embodiment, at least one of the walls 240 or ceiling 242 is translucent and an integral structure such as a single piece of organic material that can be affixed to the deck 244. In an embodiment, lighting 239 is affixed inside the passenger bridges and as illustrated, within the cab 234.

The lighting 239 inside the cab 234 may be affixed upon a safety rail 262, and directed to illuminate the walls 240 to cast reflected light inside the cab 234.

The aircraft boarding apparatus 201 also has at least one spine girder 253 that is part of the superstructure. An aircraft passenger is depicted within the cab 234 and walking upon the deck 244. Other structures are shown that may be understood as engineering drawing structures for construction of an aircraft boarding apparatus embodiment.

In an embodiment, the first passenger bridge 210 has a unit weight-to-unit-length ratio of 200 pounds/lineal foot (lb/lft), and the second passenger bridge 218 has a unit weight-to-unit-length ratio of 200 lb/lft. In an embodiment, the bridge 210 and the bridge 218 have the configuration of 200 lb/lft. In an embodiment, the bridge 210 and the bridge 218 have the configuration of 200 lb/lft and 100 lb/lft, respectively. In an embodiment, the bridge 210 and bridge 218 have the configuration of 200 lb/lft and 80 or less lb/lft, respectively. In an embodiment, the bridge 210 and bridge 218 have the configuration of 200 lb/lft and 58 or less lb/lft, respectively.

In an embodiment, the first bridge 210 and second bridge 218 have the configuration of 100 lb/lft and 200 or less lb/lft, respectively. In an embodiment, the first bridge 210 and second bridge 218 have the configuration of 100 or less lb/lft and 100 or less lb/lft, respectively. In an embodiment, the first bridge 210 and second bridge 218 have the configuration of 100 or less lb/lft and 80 or less lb/lft, respectively. In an embodiment, the first bridge 210 and second bridge 218 have the configuration of 100 or less lb/lft and 58 or less lb/lft, respectively.

In an embodiment, the bridge 210 and bridge 218 have the configuration of 80 or less lb/lft and 200 or less lb/lft, respectively. In an embodiment, the bridge 210 and bridge 218 have the configuration of 80 or less lb/lft and 100 or less lb/lft, respectively. In an embodiment, the bridge 210 and bridge 218 have the configuration of 80 or less lb/lft and 80 or less lb/lft, respectively. In an embodiment, the bridge 210 and bridge 218 have the configuration of 80 or less lb/lft and 58 or less lb/lft, respectively.

In an embodiment, the bridge 210 and bridge 218 have the configuration of 58 or less lb/lft and 200 or less lb/lft, respectively. In an embodiment, the bridge 210 and bridge 218 have the configuration of 58 or less lb/lft and 100 or less lb/lft, respectively. In an embodiment, the bridge 210 and bridge 218 have the configuration of 58 or less lb/lft and 80 or less lb/lft, respectively. In an embodiment, the bridge 210 and bridge 218 have the configuration of 58 lb/lft and 58 lb/lft, respectively.

Figure 5:
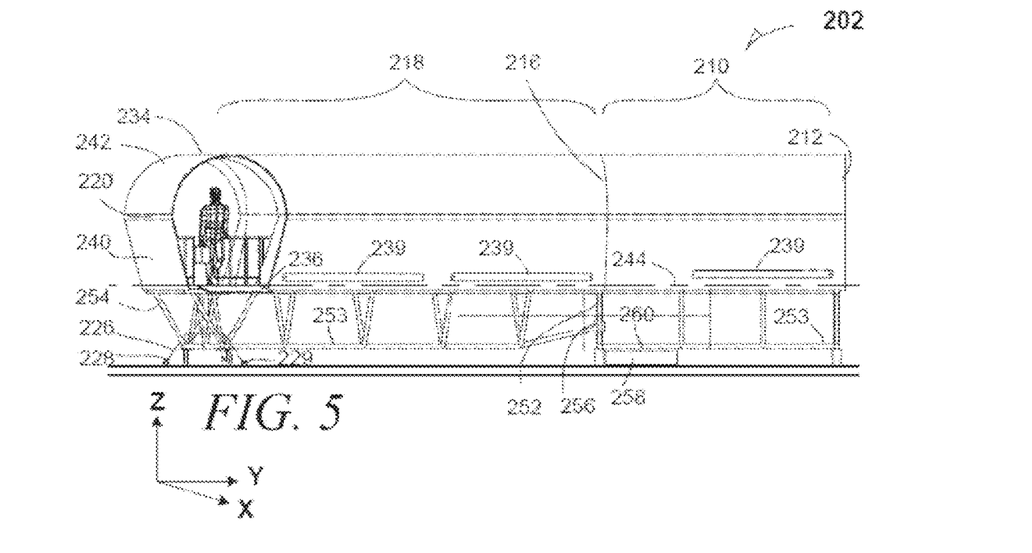
FIG. 5 is a side perspective elevation of the aircraft boarding apparatus depicted in FIG. 2 according to an embodiment.

FIG. 5 is a side perspective elevation of the aircraft boarding apparatus depicted in FIG. 2 according to an embodiment. The aircraft boarding apparatus 202 is seen in a different orientation. A passive anchor 258 is depicted resting upon the ground with an anchor loop 260 that is coupled to the spine 253 according to an embodiment. The passive anchor 258 therefore does not load any disclosed embodiment of ultralight aircraft boarding apparatus, but it is in place to secure the aircraft boarding apparatus 202 from unexpected wind loads and for and other useful purposes. The passive anchor 258 may also be referred to as a ballast 258. In an embodiment, the ballast 258, although it does not load any disclosed embodiment in the first- or second passenger bridges, may provide a unit mass per lineal until length equivalent of a conventional passenger bridge that can be used to service a large aircraft. It may now also be appreciated that the ballast 258 may merely be an eye loop that effectively uses the tarmac as the ballast.

It can now be appreciated that a passive confinement apparatus may replace the cable 226 that is secured to the ramp such as with two ground-anchored eye loops 228 and 229.

Figure 6:
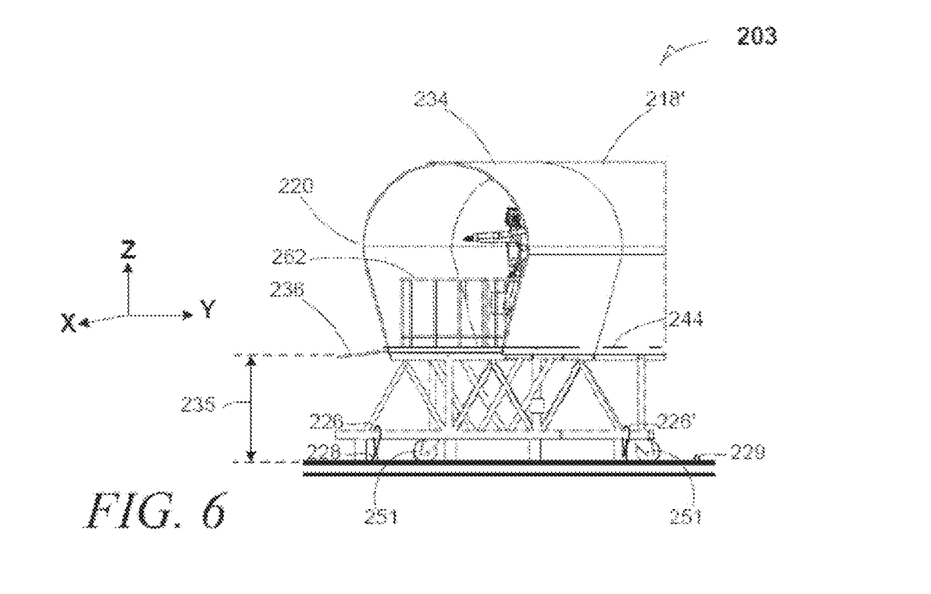
FIG. 6 is a perspective elevation of a portion of the aircraft boarding apparatus depicted in FIG. 2 according to an embodiment.

FIG. 6 is a perspective elevation of a portion of the aircraft boarding apparatus depicted in FIG. 2 according to an embodiment. The aircraft boarding apparatus 203 is seen in a different orientation and with another anchor apparatus embodiment.

A passive anchor configuration is depicted resting upon the ground with an anchor loop 228 and a first cable 226 that is coupled to the spine 253 according to an embodiment. An anchor loop 229 is also depicted that may be coupled to a second cable 226' when the aircraft boarding apparatus 203 is moved into place to allow a regional aircraft to dock therewith. This passive anchor configuration allows the anchor loops to be alternatively attached depending upon the position of the cab 234. Consequently, a ramp worker may unhook the second cable 226', move the aircraft boarding apparatus 203 to the left as depicted, and anchor the cab 234 to the first cable 226 as illustrated. In any event, this passive anchor embodiment does not load any disclosed embodiment of ultralight aircraft boarding apparatus, but it is in place to secure the aircraft boarding apparatus 202 from unexpected wind loads and other useful purposes.

A passenger is depicted within the cab 234, but a safety gate 262 has been drawn across the deck 244 within the cab 234 to prevent the passenger from approaching the boarding plate 236.

Figure 7:
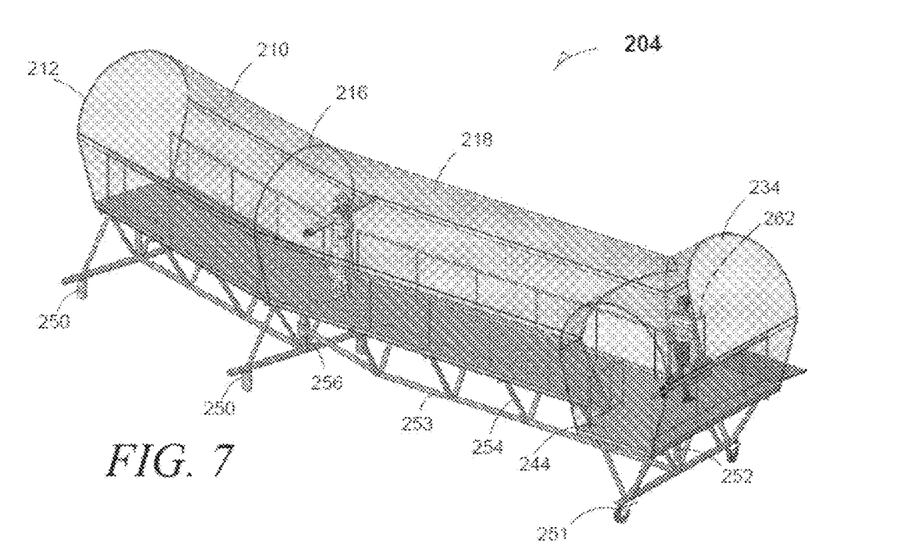
FIG. 7 is a perspective elevation of the aircraft boarding apparatus depicted in FIG. 2 according to an embodiment.

FIG. 7 is a perspective elevation of the aircraft boarding apparatus depicted in FIG. 2 according to an embodiment. The aircraft boarding apparatus 203 is seen in an orientation that is different from that depicted in FIG. 2. The first passenger bridge 210 and the second passenger bridge 218 are coupled at the articulating first interface 216. In an embodiment, the articulating first interface 216 includes a hinge 256 below the deck 244 that allows the second passenger bridge 218 to be articulated with respect to the first passenger bridge 210.

In an embodiment, at least one of the walls 240 or ceiling 242 is translucent such that natural light may illuminate a passenger's way. In an embodiment, lighting may be placed either inside the ceiling 242 or outside the aircraft boarding apparatus 203. In an embodiment, at least one of the walls 240 or ceiling 242 is translucent and an integral structure such as a single piece of organic material that can be affixed to the deck 244. It can be seen that the deck 244 may be called a first passenger deck in the first passenger bridge 210 and a second passenger deck in the second passenger bridge 218 because they are separated at the articulating first interface 216.

The aircraft boarding apparatus 203 also has at least one spine girder 253 that is part of the superstructure. One aircraft passenger is depicted within the cab 234 and walking upon the deck 244, and one aircraft passenger is depicted at the articulating first interface 216. Other structures are shown that may be understood as engineering drawing structures for construction of an aircraft boarding apparatus embodiment.

The aircraft boarding apparatus 203 may also be any of the ultralight combination embodiments that are disclosed for the aircraft boarding apparatus 100 depicted and described with reference to FIG. 1 or depicted and described with reference to FIG. 4. As a consequence of the ultralight configuration of the aircraft boarding apparatus 203, the second passenger bridge 218 may be manually articulated by a single ramp worker without the use of motorized or otherwise non-human effort.

Other structures are shown that may be understood as engineering drawing structures for construction of an aircraft boarding apparatus embodiment. For example, feet 250 may be brought into contact with the ground to facilitate stability. Wheels 251 are also depicted to allow the cab 234 to roll while the articulating first interface 216 is allowed to move. Other structures include vertical girders 252 and angle girders 254 to support the deck 244. In any event, the whole of the aircraft boarding apparatus 203 is built to achieve any of the ultralight embodiments disclosed herein.

The aircraft boarding apparatus 204 may be anchored, either actively or passively according to any permutation of active and passive anchoring embodiments. For example, the cab 234 may be actively anchored such as the active anchoring embodiments depicted in FIG. 2 or 5, and the first passenger bridge 210 may be passively anchored such as the passive anchoring embodiments depicted in FIG. 5 or 6. In an embodiment, passive anchoring is used to anchor the cab 234 such as the passive anchoring embodiments depicted in FIG. 5 or 6.

Figure 8:
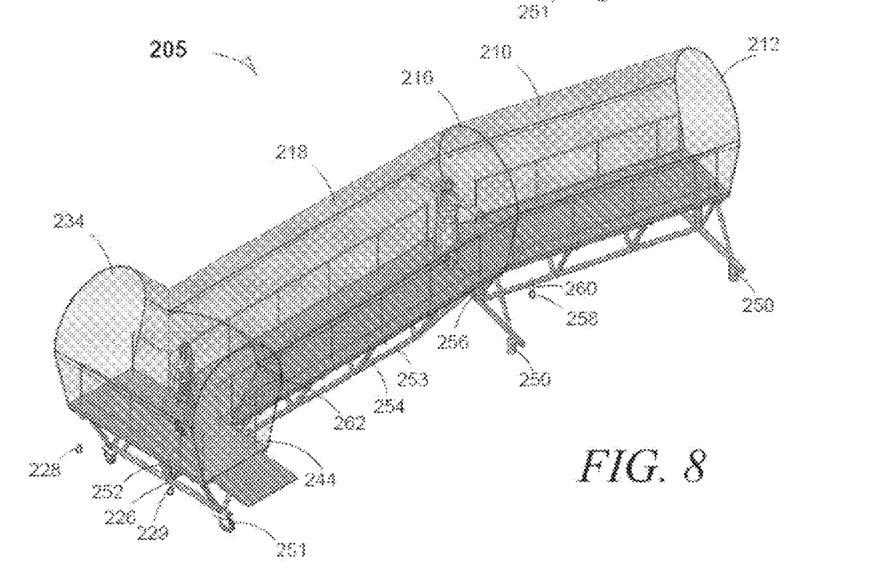
FIG. 8 is a perspective elevation of the aircraft boarding apparatus depicted in FIG. 7 according to an embodiment.

FIG. 8 is a perspective elevation of the aircraft boarding apparatus depicted in FIG. 7 according to an embodiment. The aircraft boarding apparatus 204 is seen in an orientation that is different from that depicted in FIG. 7. The aircraft boarding apparatus 204 is anchored by a ground-anchored eye loop 229 and a cable 226 that acts as a short tether. The aircraft boarding apparatus 204 is depicted in an angled articulated position to dock with a regional aircraft. When the aircraft boarding apparatus 204 is articulated such that the concourse interface 212, the articulating first interface 216, and the cab 234 are aligned, the aircraft boarding apparatus 204 can be ground anchored by the eye loop 228 to the cable 226. As depicted, the cable 226 may be center-placed on the support structure.

Figure 9:
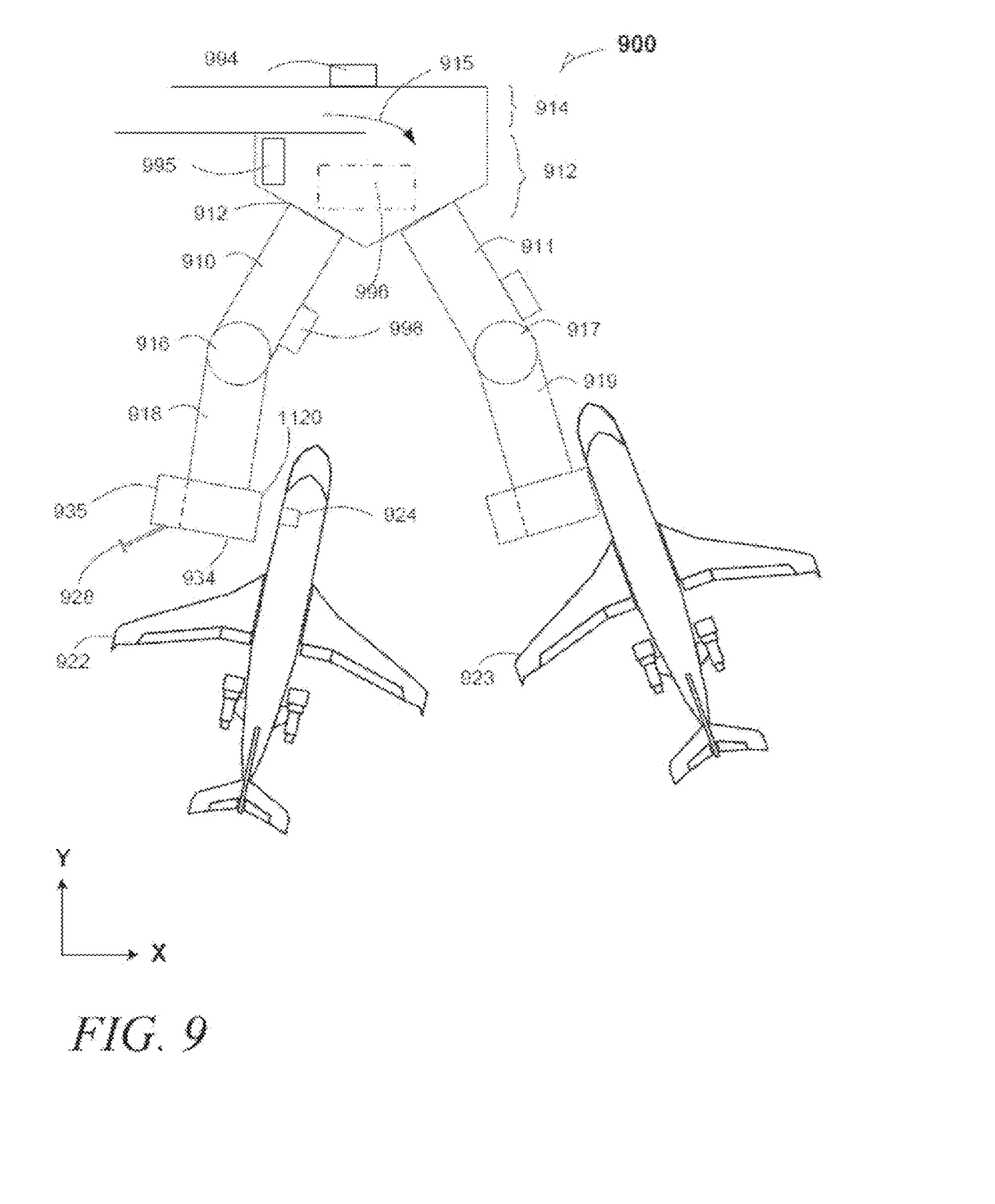
FIG. 9 is a top plan of two aircraft boarding apparatus according to an embodiment.

FIG. 9 is a top plan of two aircraft boarding apparatus 900 according to an embodiment. A first passenger bridge 910 is provided to anchor with an airport ramp. In an embodiment, the airport ramp includes a concourse interface 912 that is coupled to the external boundary 914 of an enclosed passenger concourse. The concourse interface 912 is depicted as both a joining section of the first passenger bridge 910 as well as a two-bridge rotunda 912 (depicted with a bracket).

As depicted, the external boundary 914 includes a passenger ingress/egress ramp section 915. In an embodiment where the concourse is a conventional elevated structure to accommodate regional as well as large aircraft, the passenger ingress/egress ramp section 915 is depicted as a down-to-aircraft passenger directional arrow 915. Consequently, the external boundary 914 is within a concourse building and the two-bridge rotunda 912 is disposed external to the concourse building at the external boundary 914. In an embodiment where the concourse is a ground-level structure, the passenger ingress/egress ramp section 915 is depicted as an up-to-aircraft passenger directional arrow 915 such that a passenger walks up to the concourse interface 912. For example in this embodiment, the floor of the two-bridge rotunda 912 has a height above the apron of 3 foot seven inch, and the rest of the height to meet the sill height of the regional aircraft 922 is achieved by the incline of the first passenger bridge 910 and the second passenger bridge 918.

A portion of the first passenger bridge 910 also includes an articulating first interface 916. The articulating first interface 916 can be seen in this plan layout as a circular floor element over which a passenger may walk. The aircraft boarding apparatus 900 also includes a second passenger bridge 918. In an embodiment, the second passenger bridge 918 is articulatingly coupled to the first passenger bridge 910. The second passenger bridge 918 includes an aircraft interface end 920 configured to couple with a regional aircraft 922 at the sill height of the passenger door 924.

For the aircraft boarding apparatus 900, FIG. 9 also illustrates a subsequent first passenger bridge 911, a subsequent articulating first interface 917, and a subsequent second passenger bridge 919. Other structures may be illustrated. A subsequent regional aircraft 923 is also depicted in the process of being serviced at the aircraft boarding apparatus 900. At least one confinement structure embodiment is coupled to the second passenger 919 bridge according to any disclosed embodiments. For example, the confinement structure may include a cable that is secured to the ramp such as with two ground-anchored eye loops at each end of the cable. The confinement structure, such as a cable and two eye loops, exerts an active downward anchoring force on the second passenger bridge 919 in order to secure the second passenger bridge 919 for passenger-use stability and also for wind-load stability. The confinement structure allows the aircraft interface end to align with the concourse interface 912 and the articulating first interface 917 when in a configuration that is articulated away from the subsequent regional aircraft 923.

As depicted in FIG. 9, the aircraft interface end 920 is not aligned with the concourse interface 912 and the articulating first interface 916 as the second passenger bridge 918 has been articulated to allow the regional aircraft 922 to dock. It can be appreciated that the second passenger bridge 918 can articulate to the left as depicted to approach an eye loop embodiment and the second passenger bridge 918 would then be aligned with the concourse interface 912 and the articulating first interface 916.

As a consequence of the ultralight configuration embodiments of the aircraft boarding apparatus 900, the second passenger bridge 918 may be manually articulated by a single ramp worker without the use of motorized or otherwise non-human effort. Consequently, manually articulating the second passenger bridge 918 may be done even against a contrary wind. This may be done without a mechanical-advantage assist in an embodiment where no mechanical-advantage assist is needed. And in an embodiment, this may be done with a mechanical-advantage assist where a mechanical-advantage assist is needed.

In an embodiment, the two passenger bridges draw utilities from a single module 996 such as a 400 Hz, 110 Volt power module that can be coupled to each of the two regional aircraft for ramp usage. It can now be appreciated that other utilities such as a vacuum cleaner system may be shared between two aircraft for aircraft cleaning such as during a remain overnight (RON) stop.

The aircraft boarding apparatus 900 may have any disclosed length and width embodiments for the first passenger bridge 910 length and the second passenger bridge 918. The second passenger bridge 918 is also coupled with a cab 934 such that the length of the second passenger bridge 918 is measured to the center of the cab 934. The cab 934 also has a ground-crew interface 935 that may be open to allow ground personnel to handle gate-checked baggage according to an embodiment. As a consequence of the cab 934 and the remainder of the aircraft boarding apparatus 910, a pressure seal is achieved between the external boundary 914 and the regional aircraft 922 during passenger ingress and egress.

As a consequence of the ground-crew interface 935, baggage may be checked at the aircraft door and loaded directly into the aircraft belly by the ground crew.

In an embodiment, the aircraft boarding apparatus 910 includes an electronic boarding module 994 such that a passenger may use a hand-held device such as a smart phone to gain a boarding pass. A printer 995 may be placed within the concourse interface 912 such that a passenger may obtain a hard-copy boarding pass if desired or required.

In an embodiment, a catering caddy 998 is affixed to the passenger bridge such as at the first passenger bridge 910, and the passenger may purchase or otherwise obtain amenities. For example, the passenger boarding pass may have a code that allows a catering caddy 998 to be accessed based upon the passenger fare agreement. Consequently catering amenities are obtainable by a passenger such as "open bar" or by a pay-go basis.

Figure 10:
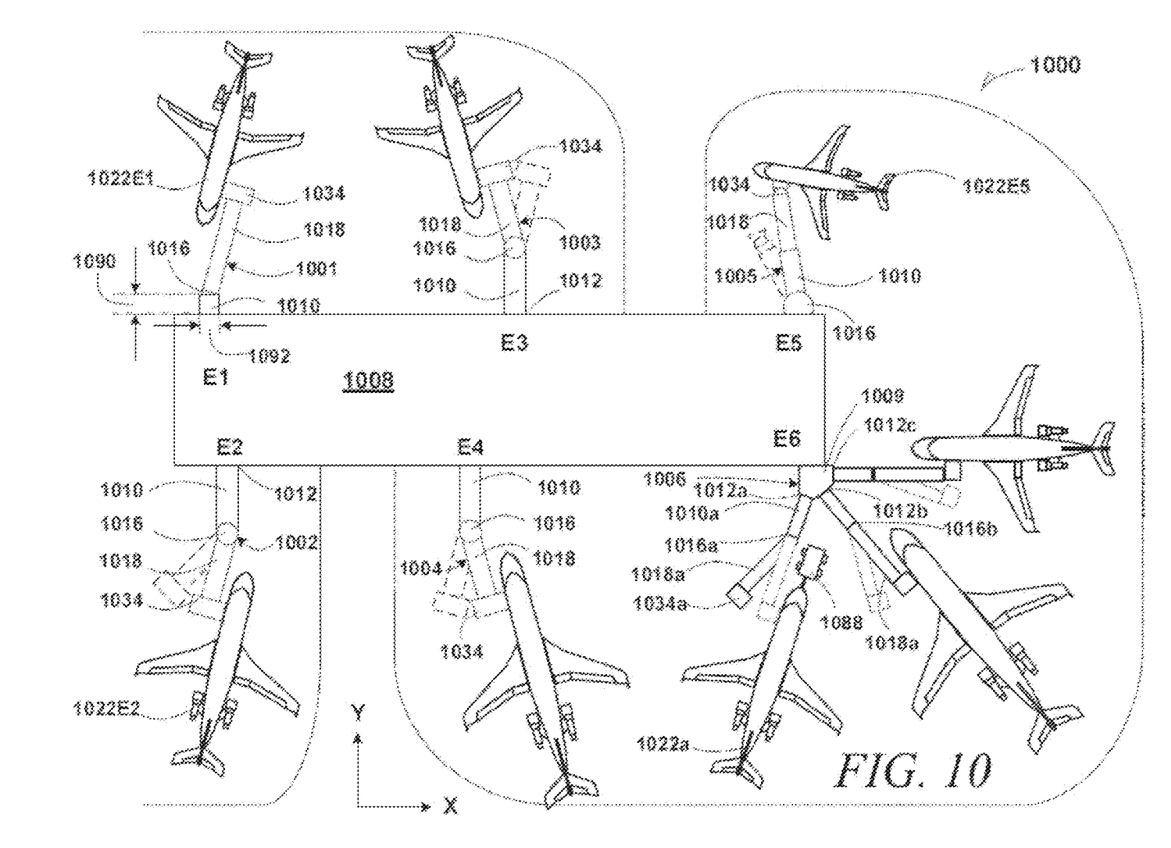
FIG. 10 is a top plan of a plurality of aircraft boarding apparatus according to an embodiment.

FIG. 10 is a plan layout 1000 for an air terminal with embodiments of aircraft boarding apparatus. The layout 1000 shows six air terminal gates, E1, E2, E3, E4, E5, and E6 for a concourse 1008. In each depicted embodiment, the unit weight to unit lineal length ratio may be any embodiment set forth in this disclosure.

At gate E1, an aircraft boarding apparatus embodiment 1001 includes a first passenger bridge 1010 that has an aspect ratio (length 1090 to width 1092) of less than 2. A second passenger bridge 1018 consequently has a significantly larger length than the first passenger bridge 1010, since the passenger bridge 1010 acts as a low aspect-ratio rotunda. The second passenger bridge 1018 is coupled to the first passenger bridge at an articulating first interface 1016. The second passenger bridge 1018 is also coupled to a cab 1034 according to an embodiment. The cab 1034 is depicted with a docked regional aircraft 1022E1.

In an embodiment, any section of the first passenger bridge 1010, the articulating first interface 116, the second passenger bridge 1018, and the cab 1034 has a unit weight per unit length ratio according to any of the disclosed unit weight per unit length ratio embodiment permutations as set forth in this disclosure. In an embodiment, any section of the aircraft boarding apparatus embodiment 1001 is dynamically anchored according to disclosed embodiments. In an embodiment, any section of the aircraft boarding apparatus embodiment 1001 is passively anchored according to disclosed embodiments.

At gate E2, an aircraft boarding apparatus embodiment 1002 includes first passenger bridge 1010, an articulating first interface 1016, a second passenger bridge 1018, and a cab 1034. The second passenger bridge 1018 is coupled to the first passenger bridge 1010 at the articulating first interface 1016. The second passenger bridge 1018 is also coupled to a cab 1034 according to an embodiment. The cab 1034 is depicted with a docked regional aircraft 1022E2.

The second passenger bridge 1018 is depicted as coupled to a regional aircraft, but it is also depicted in phantom lines to be articulated away from the port side of the regional aircraft. It can be seen that even when the second passenger bridge 1018 is in the aircraft-docked position (all solid lines), the second passenger bridge 1018 is to the right of, but not aligned with the articulating first interface 1016 and the concourse interface 1012. In other words, the aircraft boarding apparatus 1001 docks with an aircraft 1022E2 when the second passenger bridge 1018 is to the right of the symmetry (along the Y-dimension) of the first passenger bridge 1010.

In an embodiment, any section of the first passenger bridge 1010, the articulating first interface 116, the second passenger bridge 1018, and the cab 1034 has a unit weight per unit length ratio according to any of the disclosed unit weight per unit length ratio embodiment permutations set forth in this disclosure. In an embodiment, any section of the aircraft boarding apparatus embodiment 1001 is dynamically anchored according to disclosed embodiments. In an embodiment, any section of the aircraft boarding apparatus embodiment 1001 is passively anchored according to disclosed embodiments.

At gate E3, an aircraft boarding apparatus embodiment 1003 includes first passenger bridge 1010, an articulating first interface 1016, a second passenger bridge 1018, and a cab 1034. The second passenger bridge 1018 is coupled to the first passenger bridge 1010 at the articulating first interface 1016. The second passenger bridge 1018 is also coupled to a cab 1034 according to an embodiment. The second passenger bridge 1018 is depicted as coupled to a regional aircraft, but it is also depicted in phantom lines to be articulated away from the port side of the regional aircraft. It can be seen that when the second passenger bridge 1018 is in the aircraft-docked position (all solid lines), the second passenger bridge 1018 is to the right of, but not aligned with the articulating first interface 1016 and the concourse interface 112. In an embodiment, any section of the aircraft boarding apparatus embodiment 1003 is passively anchored according to disclosed embodiments.

At gate E4, an aircraft boarding apparatus embodiment 1004 includes first passenger bridge 1010, an articulating first interface 1016, a second passenger bridge 1018, and a cab 1034. The second passenger bridge 1018 is coupled to the first passenger bridge at the articulating first interface 116. The second passenger bridge 1018 is also coupled to a cab 1034 according to an embodiment. The second passenger bridge 1018 is depicted as coupled to a regional aircraft, but it is also depicted in phantom lines to be articulated away from the port side of the regional aircraft. It can be seen that when the second passenger bridge 1018 is in the aircraft-docked position (all solid lines), the second passenger bridge 1018 is to the right of, but not aligned with the articulating first interface 1016 and the concourse interface 112. In an embodiment, any section of the aircraft boarding apparatus embodiment 1004 is passively anchored according to disclosed embodiments.

At gate E5, an aircraft boarding apparatus embodiment 1005 includes first passenger bridge 1010, an articulating first interface 1016, a second passenger bridge 1018, and a cab 1034. The second passenger bridge 1018 is coupled to the first passenger bridge 1010 and the articulating first interface 1016 is coupled to the concourse 1008. The second passenger bridge 1018 is also coupled to a cab 1034 according to an embodiment. The second passenger bridge 1018 is depicted as coupled to an air taxi 1022E5, but it is also depicted in phantom lines to be collapsed (telescoped) and/or articulated away from the port side of the air taxi to allow the air taxi to push out forward if desired. In an embodiment, any section of the aircraft boarding apparatus embodiment 1003 is passively anchored according to disclosed embodiments.

At gate E6, a triple-pier aircraft boarding apparatus embodiment 1006 (also referred to as a "W-bridge") is coupled to the concourse 1008 at a rotunda 1009. In an embodiment the a double-pier ("Y-bridge") aircraft boarding apparatus may be coupled to the rotunda 1009. It may now be appreciated that the rotunda 1009 may be doubled in configuration such that six regional aircrafts access it. This may be accomplished by constructing three more passenger bridges in mirror-configuration to what is depicted. The rotunda 1009 would need to extend beyond the edge of the concourse 1008 sufficient to allow aircraft clearance. Consequently, up to six ultralight passenger bridges are configurable to allow manual articulation.

A tug 1088 is coupled to a regional aircraft 1022*a* in preparation to push back. A first pier 1006*a* includes a first passenger bridge 1010*a*, an articulating first interface 1016*a*, a second passenger bridge 1018*a*, and a cab 1034*a*. The second passenger bridge 1018*a* is coupled to the first passenger bridge 1010*a* at the articulating first interface 1016*a*. The second passenger bridge 1018*a* is also coupled to the cab 1034*a* according to an embodiment. The second passenger bridge 1018*a* is depicted in phantom lines next to the region aircraft, but it is also depicted in solid lines since it has been articulated away from the port side of the regional aircraft to allow the push back. The second passenger bridge 1018*a* is aligned with the articulating first interface 1016*b* and the concourse interface 1012*b*.

The other two aircraft-boarding apparatus piers 1006*b* and 1006*c* are depicted as attached to the rotunda 1009 at interfaces 1012*b* and 1012*c*, respectively. In a pier embodiment, any section of the aircraft boarding apparatus embodiment 1006 is passively anchored according to disclosed embodiment. In an embodiment, any section of the aircraft boarding apparatus embodiment 1006 is actively anchored according to disclosed embodiments.

It may now be appreciated that manually articulating any of the second passenger bridge embodiments depicted in FIG. 10 may include a mechanical-advantage assist such as a ratcheting mechanism assembly embodiment depicted in FIG. 2. The mechanical-advantage assist embodiment may also be applied to the telescoped bridge 1018 at gate E5.

Figure 11:
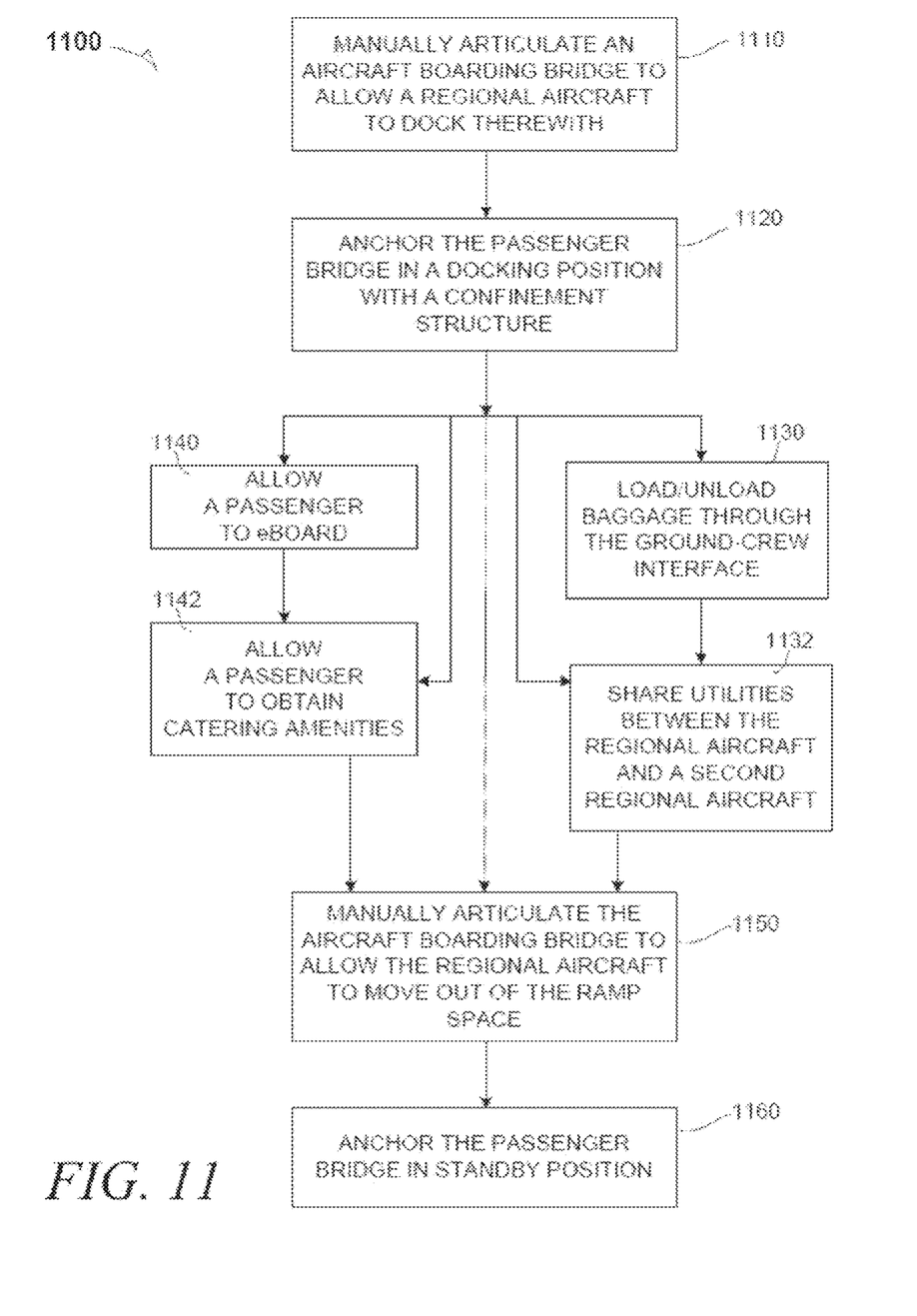
FIG. 11 is a method flow diagram according to an embodiment.

FIG. 11 is a method flow diagram 1100 according to an embodiment.

At 1110, the method includes manually articulating an aircraft boarding apparatus to allow a regional aircraft to dock therewith. In a non-limiting example embodiment, the second passenger bridge 119 (FIG. 1) has been manually pushed by a single ramp worker to dock with the regional aircraft 122 while it is in the ramp space. In a non-limiting method embodiment, manually articulating includes using a mechanical advantage such as a towbar 282. In a non-limiting method embodiment, manually articulating includes using a mechanical advantage such as a ratcheting assembly 227 that is actuated with a towbar 282.

At 1120 the method includes anchoring the aircraft boarding apparatus in docking position. In a non-limiting exemplary embodiment, the confinement structure depicted in FIG. 2 can be used as a dynamic and active anchor to anchor the cab 234 in docking position.

At 1130, the method includes at least one of loading and unloading baggage and other items through the ground-crew interface. In a non-limiting example embodiment, the cab 934 is accessed at the ground-crew interface 935 such that allow ground personnel to handle gate-checked baggage for belly loading or unloading of the regional aircraft 922.

At 1132, the method includes sharing utilities between the regional aircraft and a subsequent regional aircraft. In a non-limiting example embodiment, the regional aircraft 922 and the subsequent regional aircraft share utilities such as the power module 996.

At 1140, the method includes allowing a passenger to eBoard the regional aircraft. In a non-limiting example embodiment, the electronic boarding module 994 is accessed by a passenger such as with a hand-held device to gain a boarding pass. The printer 995 may also be accessed by the passenger such that the passenger obtains a hard-copy boarding pass.

At 1142, the method includes allowing a passenger to obtain catering amenities. In a non-limiting example embodiment, a passenger is allowed to remove catering items on a complementary basis.

It may now be understood that parallel method elements may occur. In an example method embodiment, a method proceeds from 1120 and takes in at least one method element from 1130 and 1132, and simultaneously at least one element from 1140 and 1142.

At 1150, the method includes manually articulating the aircraft boarding apparatus to allow a regional jet to move out of a ramp space. In a non-limiting example embodiment, the second passenger bridge 1022a (FIG. 10) has been manually articulated by a single ramp worker, and the regional aircraft 1022a is allowed to move in the ramp space by use of the tug 1088 to push back.

At 1160, the method includes anchoring the aircraft boarding apparatus in standby position. In a non-limiting example embodiment, the second passenger bridge 218 and the cab 234 (FIG. 6) has been anchored in a standby position by the passive anchoring system of the ground-based eye loop 228 and cable 226.

In a method embodiment, the method begins at 1110, proceeds through 1120, moves directly to 1150, and terminates at 1160. In a method embodiment, the previous four elements are included and at least one of 1130, 1132, 1140, and 1142.

It may now be appreciated that manually articulating any of the second passenger bridge embodiments depicted in this disclosure may include a mechanical-advantage assist such as a ratcheting mechanism assembly embodiment depicted in FIG. 2.

The term air taxi represents an aircraft with two-to about 10 seats, one of which is allocated for at least one pilot. In an embodiment, two pilot seats are available, but only one pilot is required to fly the aircraft, and, e.g., the right seat is available for a passenger. The term regional aircraft is an aircraft with a passenger capacity from about 6 to about 110 passengers, but which includes two pilots. Examples of regional aircraft include aircraft made by LM Bombardier, Embraer, Fairchild Aerospace, Gulf Stream, Cessna, Learjet, and others. The term "large aircraft" is an aircraft with more than 110 passenger seats. Examples of large aircraft include a narrowbody such as the MD-80 and the Boeing 757, up to a widebody such as the Boeing 767 or MD-11. The term jumbo aircraft relates to an aircraft of the class such as the Boeing 747. Hereinafter unless specifically stated otherwise, however, large and jumbo aircraft will be referred to generically as large aircraft.

The term interstitial can mean between two large aircraft. Similarly, interstitial can mean taking up a given space that is less than the docking bay area required for a single large aircraft in a docking bay. Similarly, interstitial can mean taking up a given space that is less than twice the docking bay area required for a single large aircraft in a docking bay. Similarly, interstitial can mean taking up a given space in part of the docking bay area required for two contiguous large aircraft in contiguous docking bays, which is not physically occupied by either of the large aircraft. Other meanings for interstitial are set forth in this disclosure.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

The preceding description has been presented only to illustrate and describe disclosed embodiments. It is not intended to be exhaustive or to limit the embodiments to any precise form disclosed. Many modifications and variations are possible in light of the above teaching.

Several embodiments were chosen and described in order to best explain the principles of the embodiments and their practical application. The preceding description is intended to enable others skilled in the art to best utilize the embodiments in various embodiments and with various modifications as are suited to the particular use contemplated. It is intended that the scope of the disclosed embodiments be defined by the following claims.

It will be readily understood to those skilled in the art that various other changes in the details, material, and arrangements of the parts and method stages which have been described and illustrated in order to explain the nature of the aircraft boarding piers may be made without departing from the principles and scope as expressed in the subjoined claims.

What is claimed is:

1. An aircraft boarding apparatus, comprising:
   a first passenger bridge having a first passenger deck, wherein the first passenger bridge includes a concourse interface and an articulating first interface;
   a second passenger bridge having a second passenger deck, said second passenger bridge coupled to the first passenger bridge at the articulating first interface, said second passenger bridge having an aircraft interface end configured to couple with a regional aircraft at a sill height thereof, said second passenger bridge having a confinement structure coupled thereto which exerts an active downward anchoring force on the second passenger bridge to provide a ground-anchoring effect on the second passenger bridge; and
   wherein the second passenger bridge includes a unit weight per unit length ratio between 58 and 200 lbs per lineal foot.

2. The aircraft boarding apparatus of claim 1, wherein the second passenger bridge includes a ceiling coupled to the second passenger deck.

3. The aircraft boarding apparatus of claim 2, further comprising walls coupled between the ceiling and the second passenger deck.

4. A method of connecting an airport concourse with a regional aircraft comprising:
   providing an aircraft boarding apparatus as recited in claim 1;
   articulating the boarding apparatus to allow a regional aircraft to dock therewith within a ramp space; and
   anchoring the second passenger bridge in a docking position with a confinement structure.

5. The aircraft boarding apparatus of claim 1, wherein the active downward anchoring force is dynamic.

6. The aircraft boarding apparatus of claim 1, wherein the second passenger bridge has a unit weight per unit length ratio of between 58 and 80 lbs per lineal foot.

7. The aircraft boarding apparatus of claim 1, wherein the first passenger bridge is anchored to an apron below the first passenger bridge.

8. The aircraft boarding apparatus of claim 1, wherein the articulating first interface includes a circular floor element over which a passenger may walk.

9. The aircraft boarding apparatus of claim 1, wherein the first passenger bridge includes a ceiling coupled to the first passenger deck.

10. The aircraft boarding apparatus of claim 9, further comprising walls coupled between the ceiling and the first passenger deck.

11. The aircraft boarding apparatus of claim 1, wherein the second passenger bridge can be radially articulated about the articulating interface of the first passenger bridge.

12. The aircraft boarding apparatus of claim 11, wherein the second passenger bridge can be articulated into a straight position relative to the first passenger bridge or an angled position relative to the first passenger bridge.

13. The aircraft boarding apparatus of claim 1, wherein the second passenger bridge inclines to allow the aircraft interface end to couple with the passenger door of the regional aircraft at sill height thereof.

14. The aircraft boarding apparatus of claim 1, wherein the second passenger bridge includes a ground-crew interface that allows handling and passage of baggage therethrough.

15. An aircraft boarding apparatus, comprising:
   a first passenger bridge having a first passenger deck, wherein the first passenger bridge includes a concourse interface and an articulating first interface;
   a second passenger bridge having a second passenger deck, said second passenger bridge coupled to the first passenger bridge at the articulating first interface, said second passenger bridge having an aircraft interface end configured to couple with a regional aircraft at a sill height thereof;
   wherein the second passenger bridge includes a unit weight per unit length ratio between 58 and 200 lbs per lineal foot, wherein the first and second passenger bridges are configured to service a first regional aircraft, further including a rotunda coupled to the concourse interface, wherein the rotunda is also configured to service a subsequent regional aircraft with a subsequent first passenger bridge that includes a subsequent concourse interface coupled to the rotunda, a subsequent second passenger bridge coupled to the subsequent first passenger bridge, and wherein the subsequent second passenger bridge includes an aircraft interface and is configured to couple with a subsequent regional aircraft at a sill height thereof.

16. The aircraft boarding apparatus of claim 15, further including a single module configured to couple to each of the first- and subsequent regional aircraft, wherein the single module is configured to provide electrical power to each aircraft.

17. The aircraft boarding apparatus of claim 15, further including a single module configured to couple to each of the first- and subsequent regional aircraft, wherein the single module is configured to provide electrical power to each aircraft, and wherein the single module is affixed to the rotunda.

* * * * *